United States Patent Office 3,567,550
Patented Mar. 2, 1971

3,567,550
BONDING PRESS WITH SUPPLEMENTAL
GUIDE MEANS
Herbert Kannegiesser and Richard Juraschek, Vlotho (Weser), Germany, assignors to Kannegiesser Maschinenfabrik Gesellschaft mit beschrankter Haftung, Vlotho (Weser), Germany
Filed Feb. 25, 1969, Ser. No. 802,080
Claims priority, application Germany, Mar. 11, 1968,
K 60,577
Int. Cl. B32b
U.S. Cl. 156—389                                10 Claims

ABSTRACT OF THE DISCLOSURE

This invention provides a bonding press composed of an upper heated press plate and a preferably stationary bottom press plate, through which superimposed pieces of fabric to be stuck together are fed on an endless conveyor belt. The upper heated press plate is covered on its underside by an endless covering band which in turn is covered on its underside facing the pieces of fabric by endless guide means preferably consisting of a plurality of parallel thin narrow tapes spaced apart. The conveyor belt, the covering ban and the guide means are intermittently synchronously driven, the guide means traveling on the exit side of the press beyond the point of deflection of said covering band in a direction that differs from that of said covering band after it has been deflected.

BACKGROUND OF THE INVENTION

This invention relates to bonding presses, and more specifically to a bonding press for sticking together flat pieces of fabric.

In the underwear and outerwear make-up industry linings and the like are frequently adhesively bonded in bonding presses to pieces of the outside cloth. Such bonding presses are hot bonding presses comprising an upper heated and movable press plate and a lower press table. A suitable conveyor means, particularly a conveyor belt, conveys the pieces of fabric that are to be bonded through the press between the upper heated plate and the lower press table where they are bonded together by the application of pressure and heat. Usually the pieces of fabric are conducted through the press by placing the outer fabric directly on the conveyor belt and a lining that has been previously provided with an adhesive over the outside fabric. When the hot press plate descends the adhesive may sometimes penetrate the lining and cause the bonded pieces of fabric to stick to the hot press plate. In order to overcome this difficulty it has already been proposed to use an endless adhesive-repellent covering band which travels under the hot press plate above the lining. This covering band is intermittently driven in the same direction as the pieces of fabric and in synchronism therewith and after having passed through the press it is deflected and thus separated from the bonded pieces of fabric which are intended to continue traveling on the conveyor belt.

However, in practice, with the increasing use made of adhesively bonded layers of fabric and the provision of interlinings consisting of novel materials to stiffen the fronts of garments, it has been found that the adhesive has an increased tendency to penetrate these materials and to stick to the covering band, so that the bonded pieces of fabric are entrained by the covering band over its point of deflection instead of remaining on the conveyor belt.

It has already been proposed to overcome this difficulty by locating strippers in the region where the covering band is deflected. However, such strippers are open to certain objections. On the one hand they are responsible for considerable wear of the covering band. On the other hand, the pieces of fabric that are separated by the strippers tend to ruffle and to be undesirably deformed as they run under the strippers.

SUMMARY OF THE INVENTION

The object of the present invention is, in bonding presses of the specified kind equipped with a covering band and a heated press plate, to provide means that will reliably and cleanly separate the bonded pieces of fabric from the covering band at its point of deflection on the exit side of the press without undesirably deforming the fabric.

To attain this object the present invention provides a bonding press for sticking together flat pieces of fabric, which comprises an endless covering band of adhesive-repellent material traveling across the underside of an upper press plate in synchronism with an endless conveyor belt conveying pieces of fabric through the bonding press, and supplementary endless adhesive-repellent guide means traveling synchronously with and between said covering band and said pieces of fabric under the press, said guide means being arranged to travel on the exit side of the press beyond the point of deflection of said covering band in a direction that differs from that of said covering band after it has been deflected.

More particularly, the guide means which may preferably have the form of narrow thin tapes or wires travel beyond said point of deflection of the covering band parallel to the conveyor belt carrying the bonded pieces of fabric and they are then deflected over deflecting means of their own. The distance between the point of deflection of these guide means and that of the covering band may be chosen according to practical requirements.

The guide means the invention provides, such as the narrow thin tapes, have a relatively small surface and they therefore operate to pull the bonded pieces of fabric off the covering band without themselves sticking to the fabric which therefore continues to travel on the conveyor belt. This separation of the pieces of bonded fabric from the covering band and their retention on the conveyor belt is completely automatic and reliable and ruffling or creasing of the fabric cannot occur.

BRIEF DESCRIPTION OF THE DRAWINGS

An embodiment of the invention will now be described by way of example and with reference to the accompanying schematic drawings in which.

DESCRIPTION OF THE PREFERRED EMBODIMENT

Figure 1:
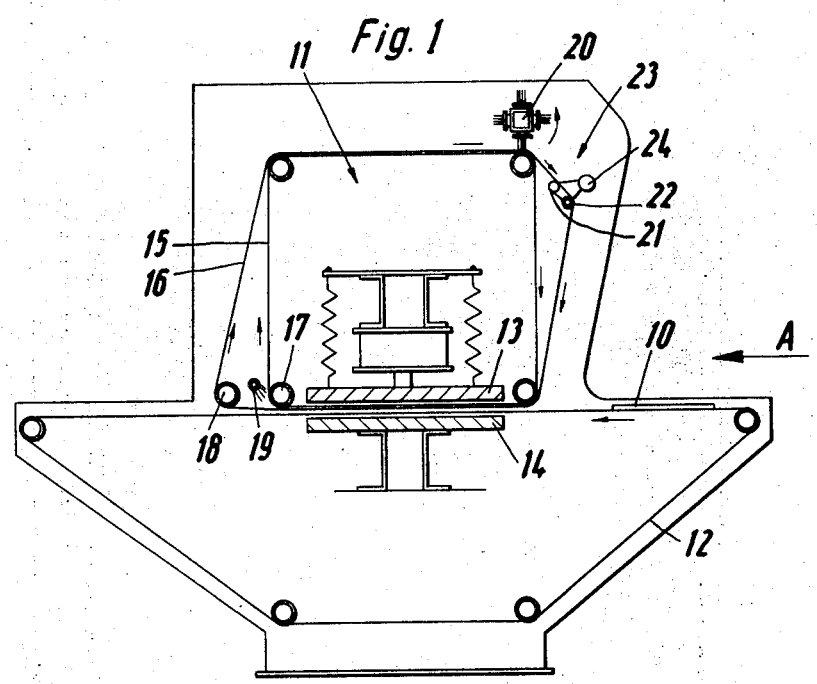
FIG. 1 is an end view of a bonding press according to the invention.
Figure 2:
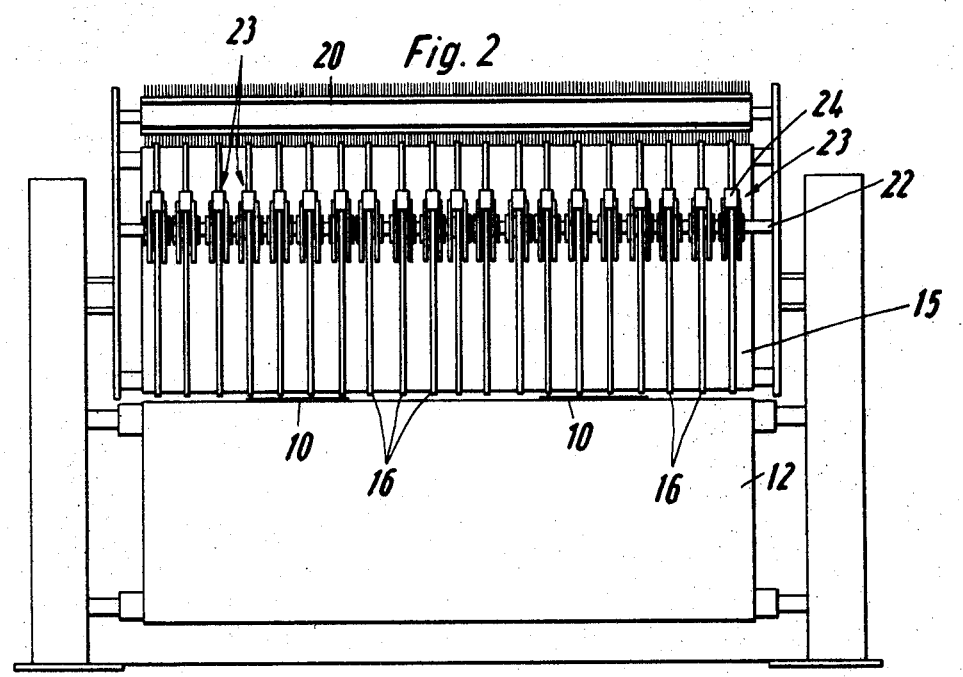
FIG. 2 is a side elevational view of the bonding press, seen in the direction of the arrow A in FIG. 1, the casing of the bonding press being omitted.

Referring now to the drawings, two pieces of fabric 10 consisting for instance of an outside fabric and a lining are superimposed, the outside fabric usually being placed underneath and the lining on top, and they are thus fed to a hot bonding press 11. For this purpose the pieces of fabric 10 are placed on a conveyor which in the illustrated embodiment has the form of an endless conveyor belt 12, but which may also consist of a sliding frame. The endless conveyor belt 12 is intermittently driven and thus conveys the pieces of fabric 10 into the hot bonding press 11 where they are pressed together between an upper heated press plate 13 and a preferably stationary bottom press plate or table 14 and stuck together. For this purpose the heated press plate 13 can be raised and lowered.

In order to prevent the bonded pieces of fabric 10 from sticking to the heated press plate 13 the latter is covered by an endless covering band 15 which is likewise intermittently driven in synchronism with and at the same speed as the endless conveyor belt 12, and which runs in a path enveloping the upper heated press plate 13. The pieces of fabric 10 are therefore bonded together between the endless conveyor belt 12 and the endless covering band 15 which is made of a heat-resisting adhesive-repellent material.

In order to prevent the bonded pieces of fabric 10 from sticking to the covering band 15 during their further transportation between the endless conveyor belt 12 and the covering band 15 and from being carried upwards around the point of deflection 17 of the covering band 15 on the exit side of the press, the present invention provides additional means to ensure an absolutely reliable separation of the bonded pieces of fabric 10 from the covering band 15. These additional means comprise endless guide means traveling together with the covering band 15 on the side thereof facing the pieces of fabric 10. In the illustrated embodiment these guide means consist of a plurality of parallel thin narrow tapes 16, preferably spaced about 100 mm. apart. These tapes are also made of an adhesive-repellent material which can withstand the temperatures that arise during the pressing operation.

The narrow tapes 16 which travel together with the covering band 15, and which are in contact with said covering band 15 at least in the region of operation of the heated press plate 13, continue to travel beyond the point of deflection 17 of the covering band 15 on the exit side of the press in a direction that differs from that of the deflected covering band 15 and that is preferably substantially parallel to the direction of travel of the endless conveyor belt 12, and these narrow tapes 16 are then taken over a special deflecting means 18 of their own. The distance between the deflecting means 18 of the narrow tapes 16 and the point of deflection 17 of the covering band 15 may be selected according to the size of the pieces of fabric 10 or by reference to any other existing conditions.

The manner in which these narrow tapes 16 are conducted ensures that the bonded pieces of fabric 10 cannot be adhesively entrained beyond the point of deflection 17 by the covering band 15 and that the pieces of fabric 10 will be separated therefrom in a manner that is both more gentle and more reliable than when using conventional strippers. Since the tapes 16 are extremely narrow and therefore have a very small surface, the pieces of fabric 10 will not adhere to these tapes 16 but continue to travel on the endless conveyor belt 12.

In order to assist the process of separation and retention of the pieces of fabric 10 on the endless conveyor belt 12 an optional feature of the invention consists in providing supplementary separating means between the point of deflection 17 of the covering band 15 and the deflecting means 18. In the illustrated embodiment these supplementary separating means consist of a blowing tube 19 disposed across the direction of travel and adapted to discharge jets of air between the covering band 15 and the pieces of fabric 10 where these are required to separate. Instead of a blowing tube 19 or in addition thereto other means, such as a separatory plate, might be provided in the region between the point of deflection 17 and the deflecting means 18.

According to yet another feature of the invention the covering band 15 and the narrow tapes 16 are jointly continuously cleaned. For this purpose the illustrated embodiment provides a revolving brush 20 placed with its axis of rotation across the direction of travel of the covering band 15 and the narrow tapes 16 and rotating in the same direction as the covering band 15 and the narrow tapes 16 travel, though at a higher peripheral speed.

Moreover, means are provided for maintaining a predetermined tension of the narrow tapes 16. To this end each narrow tape 16 is taken over rollers 21 and 22 of a tensioning device 23. In the illustrated embodiment this tensioning device 23 comprises a cranked lever fulcrumed in the region of the roller 22 and having a free arm loaded by a weight 24 urging the cranked lever to tilt in a direction in which the roller 21 on the other arm is urged against the back of the narrow tapes 16.

In an arrangement according to the invention the narrow tapes 16 which cooperate with the covering band 15 may be extremely narrow and thin because they travel synchronously with the covering band 15 and are therefore subject to very little wear. Surprisingly this ensures a much longer life of the thin narrow tapes 16.

What is claimed is:
1. A bonding press for sticking together pieces of fabric, comprising:
   (a) an endless covering band of adhesive-repellent material traveling across the underside of an upper press plate in synchronism with an endless conveyor belt conveying pieces of fabric through the bonding press, and
   (b) supplementary endless adhesive-repellent guide means traveling synchronously with and between said covering band and said pieces of fabric under the press, said guide means being arranged to travel on the exit side of the press beyond the point of deflection of said covering band in a direction that differs from that of said covering band after it has been deflected.

2. A bonding press according to claim 1, wherein said guide means are thin narrow tapes made of a temperature-resistant material.

3. A bonding press according to claim 2, wherein said thin narrow tapes are arranged to travel in parallel spaced about 100 mm. apart.

4. A bonding press according to claim 2, in which each of said thin narrow tapes is separately tensioned by tensioning means.

5. A bonding press according to claim 4, wherein said tensioning means comprise rollers in association with a weighted lever.

6. A bonding press according to claim 1, comprising cleaning means for cleaning off said guide means and said covering band.

7. A bonding press according to claim 6, wherein said cleaning means have the form of a brush rotatable about an axis extending across the direction of travel of said guide means and said covering band rotation of said brush being preferably in said direction of travel, but at a higher peripheral speed.

8. A bonding press according to claim 1, comprising separating means extending across the direction of travel of the pieces of fabric on the exit side of the press between the points of deflection of said covering band and said guide means.

9. A bonding press according to claim 8, wherein the separating means are a blowing tube.

10. A bonding press according to claim 9, wherein the blowing tube is arranged to discharge air jets between said covering band and said pieces of fabric at the point of separation where said covering band is deflected.

References Cited
UNITED STATES PATENTS 2,368,111  1/1945  Burton _____ 156—323
2,441,940  5/1948  Rohdin _____ 156—389

BENJAMIN A. BORCHELT, Primary Examiner

A. W. MILLER, Assistant Examiner

U.S. Cl. X.R.

156—289, 323, 580